US012591213B2

(12) United States Patent
Cheng et al.

(10) Patent No.: US 12,591,213 B2
(45) Date of Patent: Mar. 31, 2026

(54) INTELLIGENT WARM-UP METHOD OF MACHINE TOOL

(71) Applicant: National Chung Cheng University, Chia-yi County (TW)

(72) Inventors: Chih-Chun Cheng, Tainan City (TW); Wen-Nan Cheng, Tainan City (TW); Zhen-Wei Zhuang, Chia-Yi County (TW); Yu-Sheng Chiu, Changhua County (TW); Wei-Jen Chen, Chiayi City (TW)

(73) Assignee: NATIONAL CHUNG CHENG UNIVERSITY, Chia-Yi County (TW)

( * ) Notice: Subject to any disclaimer, the term of this patent is extended or adjusted under 35 U.S.C. 154(b) by 377 days.

(21) Appl. No.: 18/230,191

(22) Filed: Aug. 4, 2023

(65) Prior Publication Data

US 2024/0419146 A1    Dec. 19, 2024

(30) Foreign Application Priority Data

Jun. 14, 2023    (TW) ................................. 112122129

(51) Int. Cl.
*G05B 19/404* (2006.01)
*B23Q 11/00* (2006.01)
(Continued)

(52) U.S. Cl.
CPC ......... *G05B 19/404* (2013.01); *G05B 19/401* (2013.01); *B23Q 11/0003* (2013.01); *B23Q 15/18* (2013.01); *G05B 19/18* (2013.01)

(58) Field of Classification Search
CPC ...... G05B 19/18; G05B 13/04; G05B 19/401; B23Q 15/18; B23Q 11/0003
(Continued)

(56) References Cited

U.S. PATENT DOCUMENTS 7,266,903 B2 * 9/2007 Sato ..................... G05B 19/404
                                                      700/193
8,255,075 B2 * 8/2012 Ou ....................... G05B 19/404
                                                      374/45
(Continued)

FOREIGN PATENT DOCUMENTS

CN        101943896 A    1/2011
CN        113118868 A    7/2021
          (Continued)

OTHER PUBLICATIONS

Chiu et al.; The Thermal Error Estimation of the Machine Tool Spindle Based on Machine Learning; 18 pages; published Aug. 30, 2021.*

(Continued)

*Primary Examiner* — Ronald D Hartman, Jr.
(74) *Attorney, Agent, or Firm* — WPAT, PC

(57) ABSTRACT

An intelligent warm-up method of machine tool, applicable to a machine tool, includes: a step of, based on temperature change data and thermal displacement data of a spindle measured at different time points, establishing a thermal compensation model; a step of, while the machine tool performs a warm-up process, inputting temperature change values measured at least one component of the machine tool at intervals to the thermal compensation model to obtain corresponding thermal-displacement estimated values of the spindle at different time points and changes of thermal displacement values at individual time points; and, a step of, based on the changes of the thermal displacement values at the individual time points, deriving corresponding warm-up completion degrees.

6 Claims, 2 Drawing Sheets

(51) Int. Cl.
    *B23Q 15/18*       (2006.01)
    *G05B 19/18*       (2006.01)
    *G05B 19/401*     (2006.01)

(58) Field of Classification Search
    USPC ........................................................ 700/159
    See application file for complete search history.

(56) References Cited

U.S. PATENT DOCUMENTS

| | | | |
|---|---|---|---|
| 8,924,003 B2 * | 12/2014 | Maekawa ............ | G05B 19/404 |
| | | | 700/193 |
| 9,956,660 B2 | 5/2018 | Koyama | |
| 10,088,826 B2 * | 10/2018 | Jalluri .................. | G05B 19/401 |
| 2013/0190921 A1 * | 7/2013 | Maekawa .......... | B23Q 11/0007 |
| | | | 700/177 |
| 2015/0370242 A1 * | 12/2015 | Takeno ................ | G05B 19/404 |
| | | | 700/193 |
| 2016/0054722 A1 * | 2/2016 | Jalluri .................. | G05B 19/401 |
| | | | 700/195 |

FOREIGN PATENT DOCUMENTS

| | | |
|---|---|---|
| TW | M364561 U | 9/2009 |
| TW | M543138 U | 6/2017 |
| TW | 201819102 A | 6/2018 |
| TW | 201903717 A | 1/2019 |
| TW | 201915626 A | 4/2019 |

OTHER PUBLICATIONS

TW OA issued on Apr. 18, 2024.

* cited by examiner

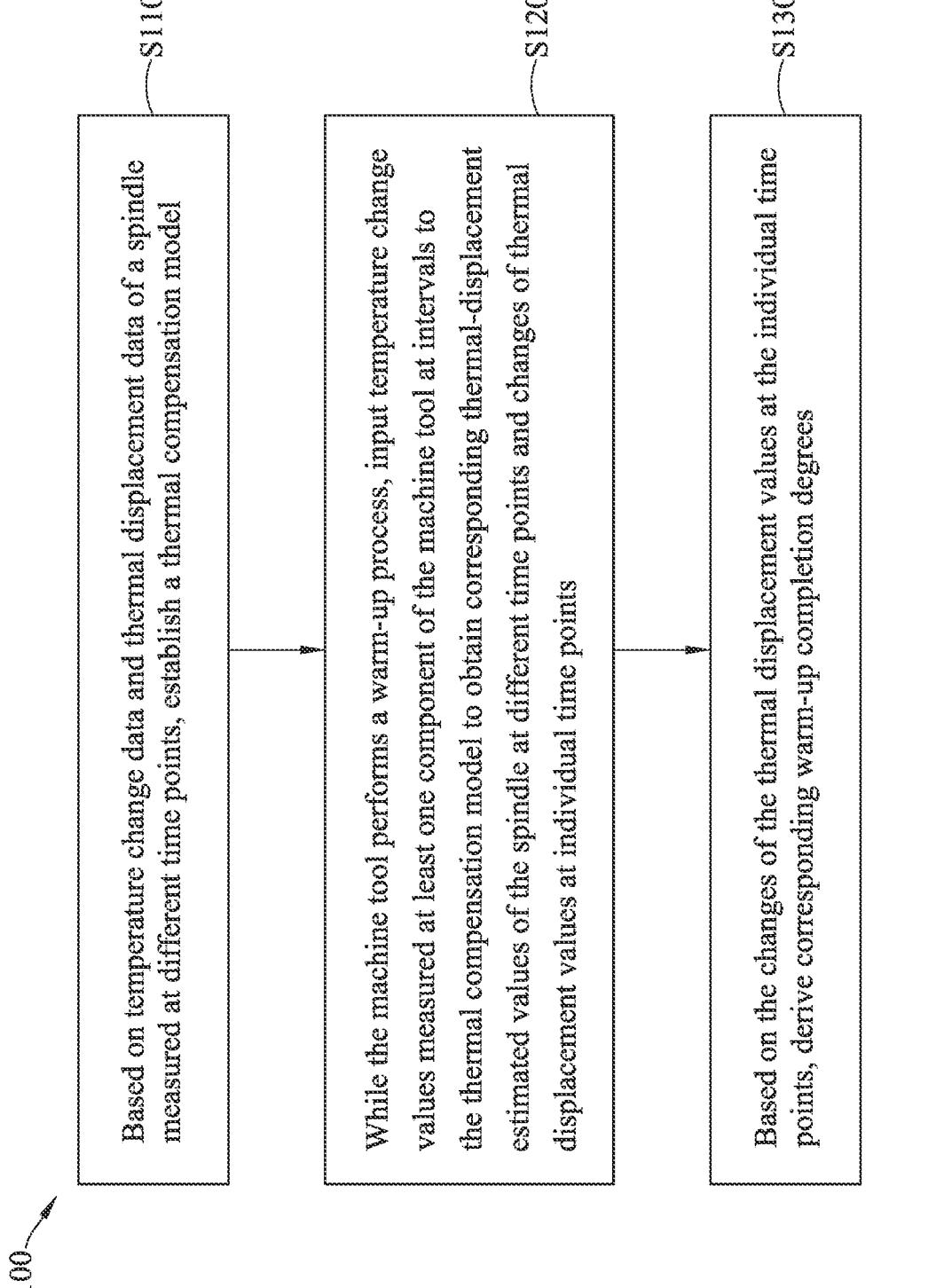

S100

S110
Based on temperature change data and thermal displacement data of a spindle measured at different time points, establish a thermal compensation model S120
While the machine tool performs a warm-up process, input temperature change values measured at least one component of the machine tool at intervals to the thermal compensation model to obtain corresponding thermal-displacement estimated values of the spindle at different time points and changes of thermal displacement values at individual time points S130
Based on the changes of the thermal displacement values at the individual time points, derive corresponding warm-up completion degrees

FIG. 1

INTELLIGENT WARM-UP METHOD OF MACHINE TOOL

CROSS REFERENCE TO RELATED APPLICATION

This application claims the benefits of Taiwan application Serial No. 112122129, filed on Jun. 14, 2023, the disclosures of which are incorporated by references herein in its entirety.

TECHNICAL FIELD

The present disclosure relates in general to a warm-up method of machine tool.

BACKGROUND

Warming up is one of important procedures before processing of a machine tool. This procedure is usually carried out in a fixed working condition and at a fixed time. No efficient way exists to achieve the same purpose of warming up. If execution of the warm-up procedure is not accurate and complete, accuracy of the following machining may be affected. In addition, if the warm-up time is too long, then scheduling of subsequent product production would be affected as well. Namely, it is easy to see that the completion degree of the warm-up process would affect directly the processing accuracy of the subsequent machining of the machine tool.

In the art, a conventional criterion to judge whether or not the warm-up process is complete is based on an evidence that a specific component of the machine tool reaches a predetermined temperature. However, since the ambient temperature in the actual working field is not easy to control, and the temperature measurement is also easily affected by external neighboring heat sources, thus the judgment of a complete warm-up process is not so accurate to ensure the following machining precision.

Furthermore, since structuring of the machine tool is complex, thus a temperature at a specific component of the machine tool cannot immediately reflect a thermal displacement error at a tip point of the tooling on a spindle of the machine tool. In general, thermal expansion or contraction of the heat-affected component is not ideally proportional or inversely proportional to the thermal displacement at the tip point. As such, the judgment of the complete warm-up process only through the temperature at a certain component is obviously not so reliable. Also, with the conventional judgment criterion, the completion time of the warm-up process cannot be effectively controlled or predicted.

SUMMARY

An object of the present disclosure is to provide a warm-up method of machine tool that can introduce a relevant warm-up process and a predictable warm-up time, and thus time cost thereto can be substantially reduced.

In this disclosure, a warm-up method of machine tool, applicable to a machine tool, includes the steps of: based on temperature change data and thermal displacement data of a spindle measured at different time points, establishing a thermal compensation model; while the machine tool performs a warm-up process, inputting temperature change values measured at least one component of the machine tool at intervals to the thermal compensation model to obtain corresponding thermal-displacement estimated values of the spindle at different time points and changes of thermal displacement values at individual time points; and, based on the changes of the thermal displacement values at the individual time points, deriving corresponding warm-up completion degrees.

In one embodiment of this disclosure, the step of establishing the thermal compensation model includes the steps of: defining the temperature change values of the at least one component of the machine tool collected at the different time points to be input values; defining displacement values of a tip point of the spindle collected at the different time points to be output values; and, based on the input values and the output values, establishing the thermal compensation model.

In one embodiment of this disclosure, the step of defining the temperature change values of the at least one component of the machine tool collected at the different time points to be the input values includes the steps of: mounting a plurality of temperature sensors to the at least one component of the machine tool to measure the temperature values of the at least one component of the machine tool; defining a first measurement of the temperature values of the at least one component to be an initial temperature value; and, obtaining the temperature change values of the at least one component by subtracting the initial temperature value from the corresponding temperature values of the at least one component measured at the different time points.

In one embodiment of this disclosure, the step of defining displacement values of the tip point of the spindle collected at the different time points to be output values includes a step of: mounting at least one displacement sensor to the machine tool for measuring the displacement value of the tip point of the spindle.

In one embodiment of this disclosure, the step of establishing the thermal compensation model includes a step of: training the input values and the output values via a machine learning method so as to obtain the thermal compensation model.

In one embodiment of this disclosure, the step of establishing the thermal compensation model includes a step of: applying a multiple regression analysis to calculate the input values and the output values to obtain the thermal compensation model.

In one embodiment of this disclosure, the step of obtaining the corresponding thermal-displacement estimated values of the spindle at the different time points and the changes of the thermal displacement values at the individual time points includes the steps of: inputting the temperature change values to the thermal compensation model to obtain the thermal-displacement estimated values of the tip point of the spindle at the different time points; and, calculating the changes of the thermal displacement values at the individual time points.

In one embodiment of this disclosure, the step of deriving the corresponding warm-up completion degrees includes the steps of: defining a ratio of the change of the thermal displacement value at one of the individual time point other than a first time point to the change of the thermal displacement value at the first time point as a corresponding calculation basis; defining an absolute value of the calculation basis to be a deduction; and, obtaining the warm-up completion degree by subtracting the deduction from 1 to obtain a value and further multiplying the value by 100.

In one embodiment of this disclosure, the step of defining the ratio includes the steps of: setting a threshold value; and, a 100% warm-up completion degree being achieved if the change of the thermal displacement values at one of the individual time points reaches the threshold value.

As stated, in converting the thermal-displacement estimated value of the spindle into the warm-up completion degree in accordance with this disclosure, the thermal compensation model for the tip point of the spindle of the machine tool is utilized to estimate the thermal-displacement estimated value (i.e., the displacement change at the tip point), and further the change of the thermal displacement value at each time unit can be obtained and further quantified into the warm-up completion degree. Finally, the remaining time to complete the warm-up process can be provided for facilitating the scheduling of follow-up work.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1 is a schematic flowchart of an embodiment of the warm-up method of machine tool in accordance with this disclosure.

DETAILED DESCRIPTION

Figure 2:
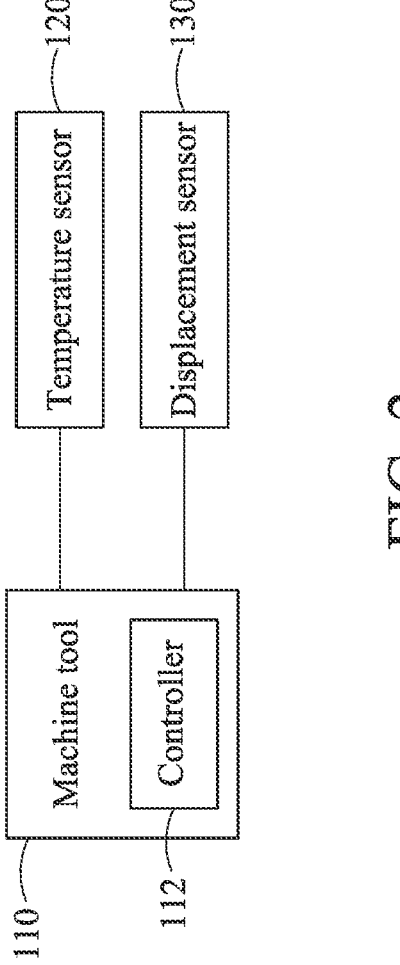
FIG. 2 is a schematic view of an embodiment of the machine tool in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following description, terms such as "including", "comprising", and "having" mentioned in this disclosure are all open terms to provide a meaning of "including but not limited to".

In the following description of various embodiments, when terms such as "first", "second", "third", "fourth" etc., are used to describe elements, they are only used to distinguish these elements from each other, but not to limit order or importance of these elements.

In the following description of various embodiments, the so-called "coupling" or "connection" may refer to two or more elements being in direct physical or electrical contact with each other, or indirect physical or electrical contact with each other. In addition, terms "coupling" or "connecting" may also mean that two or more elements are related in motion with each other.

Refer to FIG. 1 and FIG. 2; where FIG. 1 is a schematic flowchart of an embodiment of the warm-up method of machine tool in accordance with this disclosure, and FIG. 2 is a schematic view of an embodiment of the machine tool in accordance with this disclosure. In the art, demands upon machining precision and efficiency to a machine tool 110 are usually crucial. Generally, while in machining, one of major reasons contributed to machining errors of the machine tool 110 is the thermal displacements of the machine tool 110. When the machine tool 110 is restarted after a period of stop time (for example, the first run after a holiday), the temperature of a motor of the machine tool 110 would rise rapidly to result in a critical hike in the thermal displacement thereof. After the machine tool 110 is started for a period of time till the motor temperature is stable, a thermal balance state of the machine tool 110 can be achieved, and the related thermal displacement would be stalled. As described above, the completion of the warm-up process of the machine tool 110 prior to machining thereof is important and so determined to dominate the following machining precision of the machine tool 110, and thus the warm-up method of machine tool S100 provided in this disclosure is particularly applicable to the machine tool 110 furnished with a controller 112 to process workpieces. In this embodiment, the warm-up method of machine tool S100 includes Step S110 to Step S130 as follows.

Firstly, in performing Step S110, based on temperature change data and thermal displacement data of a spindle measured at different time points, a thermal compensation model can be established.

The Step S110 can include a sub step of: mounting a plurality of temperature sensors 120 at a plurality of components of the machine tool 110, to measure temperature values of the individual components of the machine tool 110. The first measurement of the temperature value at the specific component is defined as an initial temperature value of this specific component. A temperature change value of a specific component at a specific time point is defined as a difference between the temperature value of the component measured at the specific time point and the initial temperature value thereof. The temperature change value of the specific component of the machine tool 110 at the specific time point would be used as an input value to the thermal compensation model. In this disclosure, the component of the machine tool 110 can be a motor, a casting, a bearing seat or any relevant component thereof. According to practical requirements, the components to be detected can be changed.

Then, at least one displacement sensor 130 is mounted onto the machine tool 110, for measuring a displacement value of a tip point of the spindle. With the temperature change values of individual components of the machine tool 110 collected at the different time points as the input value, the displacement value at the tip point of the spindle collected at each of the same different time points is defined as an output value. In this embodiment, according to different machine tools, the displacement detecting module can be properly arranged at a relevant place to perform the measurement of the displacement values. For example, a detection bar can be mounted at the spindle of the machine tool 110 to simulate the thermal displacement at the tip point, an X-axial displacement gauge can be mounted in an X direction at the tip point of the spindle to obtain a local displacement in the X direction, a Y-axial displacement gauge can be mounted in a Y direction at the tip point of the spindle to obtain a local displacement in the Y direction, and a Z-axial displacement gauge can be mounted in a Z direction at the tip point of the spindle to obtain a local displacement in the Z direction. Thereupon, axial displacement values of the tip point can be obtained.

Then, the input and output values with respect to the time points are inputted into the controller 112 for establishing the thermal compensation model based on the relationship between the input values and the output values. In this disclosure, a method for establishing the thermal compensation model includes a step of: having a machine learning method to train the relationship between the input values and the output values so as to obtain the thermal compensation model. In this embodiment, the machine learning method can utilize the back propagation neural network. Namely, through the machine learning method, a training result can be derived from the temperature change value and the corresponding displacement values of the tip points at each of the time points. The training result can be utilized as the thermal compensation model, but not limited thereto. In another embodiment, the step of establishing the thermal compensation model can include a step of: utilizing a multiple regression analysis to calculate the relationship of the input values and the output values so as to derive the thermal compensation model. In other words, the multiple regression analysis is applied upon the temperature change values and the corresponding displacement values at the tip point at every individual time points so as to derive a mathematical model as the thermal compensation model.

After the thermal compensation model has been established in Step S110, then Step S120 is performed. In Step S120, a warm-up process is performed at the machine tool 110 by inputting the temperature change values measured at intervals to the thermal compensation model so as to obtain corresponding thermal-displacement estimated values of the spindle at plural time points and changes of the thermal displacement values at individual time points. It shall be explained that the interval of the time points can be adjusted according to practical machining conditions. In particular, the thermal-displacement estimated values of the tip point of the spindle at the individual time points are obtained by inputting the temperature change values of individual components at corresponding time points. Then, at every unit of time, the change of the thermal displacement value is calculated. For example, as listed in Table 1 as follows, the unit time is given to be a 20-minute period. While the warm-up process is performed to the $20^{th}$ minutes, then first change of the thermal displacement value can be calculated, also defined as the initial unit time change of the thermal displacement value. The calculation would be to subtract the thermal-displacement estimated value 0 at the $0^{th}$ minute from the thermal-displacement estimated value $-8.7$ at the $20^{th}$ minute to get $-8.7$. Thereafter, for every a period of time (for example, 1 minute), a change of the thermal displacement value for the time point is calculated. For example, in Table 1, if the thermal-displacement estimated value at the $21^{st}$ minute is given as $-9.13$, and the thermal-displacement estimated value at the $1^{st}$ minute is given as $-0.53$, then the change of the thermal displacement value at this $21^{st}$-minute time point would be $-9.13-(-0.53)$ $=-8.6$. Thereupon, according to this disclosure, the calculation of the thermal-displacement estimated value through the thermal compensation model is not a direct measurement of the thermal displacement.

TABLE 1

| Changes of the thermal displacement value per unit time | | | | |
|---|---|---|---|---|
| Time of warm-up process (min) | 0~20 | 1~21 | 2~22 | 3~23 |
| Change of thermal displacement value (μm) per unit time | −8.7 | −8.6 | −8.02 | −7.8 |

After the thermal-displacement estimated values of the spindle and the changes of the thermal displacement value per unit time at the individual time points are obtained in Step S120, then Step S130 is performed to derive, a warm-up completion degree according to the plurality of the changes of the thermal displacement value per unit time.

In one embodiment, the warm-up completion degree can be calculated by the following equation:

$$\text{Warm-up completion degree (\%)} = \tag{1}$$

$$\left(1 - \left|\frac{\text{Change of thermal displacement value per unit time}}{\text{Change of thermal displacement value at initial unit time}}\right|\right) \times 100$$

In equation (1), a ratio of the change of the thermal displacement value per unit time to the change of the thermal displacement value at initial unit time (i.e., the $1^{st}$ change of the thermal displacement value per unit time) is defined as a calculation basis. Then, an absolute value of this calculation basis is obtained to be a deduction. The warm-up completion degree is calculated by subtracting the deduction from 1 to get a value and then multiplying the value by 100. While the machine tool 110 is started up, the thermal displacement value would rise rapidly due to the temperature rising at the motor. As such, the first change of the thermal displacement value per unit time (i.e., the initial change of the thermal displacement value) would be larger. However, after a period of time, the temperature rising at the motor would be gradually slowed down, or evenly become zero. Then, the machine tool 110 would be close to a thermal balance, and thus the thermal displacement value would become stable. This is reason why, in this embodiment, the ratio of the change of the thermal displacement value per unit time to the $1^{st}$ change of the thermal displacement value per unit time is defined as the calculation basis, and used to calculate the warm-up completion degree. For example, by referring to Table 1, the corresponding warm-up completion degrees would be derived as follows in Table 2.

TABLE 2

| Warm-up completion degrees | | | | |
|---|---|---|---|---|
| Time of warm-up process (min) | 0~20 | 1~21 | 2~22 | 3~23 |
| Change of thermal displacement value (μm) per unit time | −8.7 | −8.6 | −8.02 | −7.8 |
| Warm-up completion degree (%) | | 1.15 | 7.82 | 10.34 |

For example, in a typical warm-up process prior to a normal machining run, the setting of the spindle speed during the warm-up process shall be firstly adjusted according to practical machining speeds, and then the warm-up process can begin. At the same time, temperature sensor 120 would capture the temperature value of the machine tool 110. Through the thermal compensation model, the captured temperature value would be used to estimate the thermal-displacement estimated value at the tip point of the spindle of the machine tool 110. Also, through the thermal compensation model, the corresponding thermal-displacement estimated value of the spindle can be obtained, and then quantified to be the warm-up completion degree. Namely, according to this disclosure, no direct measurement at the tip point is required.

In another embodiment, the calculation of the warm-up completion degree can follow equation (2) as listed below:

$$\text{Warm-up completion degree (\%)} = \tag{2}$$

-continued $$\left(1 - \left|\frac{\text{Change of thermal displacement value per unit time} - X}{\text{Change of thermal displacement value at initial unit time}}\right|\right) \times 100$$

In equation (2) modified from equation (1), X stands for a threshold value set according to practical needs. The threshold value is defined as the minimum of the change of the thermal displacement value within the concerned unit time. Since the change of the thermal displacement value within the time unit may drop as the time goes. Practically, the calculation of the change of the thermal displacement value may approach zero, and thus the related setting can be made according to practical requirements in machining accuracy and thermal-error compensation frequency. Upon when all the changes of the thermal displacement value per unit time reach the predetermined threshold value, it implies that the warm-up completion degree is 100%. Namely, the warm-up process of the machine tool 110 is finished.

Further, in one embodiment, since the change of the thermal displacement value may fluctuate with the practical conditions, thus the warm-up completion degree may not be gradually rising. As such, one improved embodiment of this disclosure can further include a judgment process. The judgment process is to replace the instant warm-up completion degree by the previous warm-up completion degree if the instant warm-up completion degree is less than the previous warm-up completion degree. If the instant warm-up completion degree is greater than the previous warm-up completion degree, the no change is necessary. If the warm-up completion degree is greater than 100, then the warm-up completion degree would be amended to be 100%, and it implies that the warm-up process is complete.

Further, in one embodiment, the aforesaid warm-up completion degree can be converted into an estimated remaining time to complete the warm-up process. In addition, the time remained to complete the warm-up process would be estimated in a real-time manner, and corresponding amendment would be made as necessary to facilitate the scheduling of follow-up work. The conversion of this embodiment can be:

$$t_r(\text{min}) = \frac{t_s}{\text{Instant warm-up completion degree (\%)}} \times 100 - t_s \quad (3)$$

In equation (3), $t_r$ is the remaining time in minute to complete the warm-up process, $t_s$ is the time in minute that the warm-up process already goes. Namely, through the ratio of $t_s$ to the instant warm-up completion degree, the time for every percentage of the warm-up completion degree can be realized. In other words, the remaining time $t_r$ to complete the warm-up process can be estimated by subtracting $t_s$ from the estimated time to complete the warm-up process.

In summary, in order to convert the thermal-displacement estimated value of the spindle into the warm-up completion degree in accordance with this disclosure, the thermal compensation model for the tip point of the spindle of the machine tool is utilized to estimate the thermal-displacement estimated value (i.e., the displacement change at the tip point), and further the change of the thermal displacement value at each time unit can be obtained and further quantified into the warm-up completion degree. Finally, the remaining time to complete the warm-up process can be provided for facilitating the scheduling of follow-up work.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A warm-up method of a machine tool, applicable to a machine tool, comprising the steps of:
based on temperature change data and thermal displacement data of a spindle measured at different time points, establishing a thermal compensation model;
while the machine tool performs a warm-up process, inputting temperature change values measured at least one component of the machine tool at intervals to the thermal compensation model to obtain corresponding thermal-displacement estimated values of the spindle at different time points and changes of thermal displacement values at individual time points; and
based on the changes of the thermal displacement values at the individual time points, deriving a corresponding warm-up completion degree for each individual time point;
wherein establishing the thermal compensation model includes:
defining the temperature change values of the at least one component of the machine tool collected at the different time points to be input values;
defining displacement values of a tip point of the spindle collected at the different time points to be output values includes mounting at least one displacement sensor to the machine tool for measuring the displacement value of the tip point of the spindle; and
based on the input values and the output values, establishing the thermal compensation model;
wherein obtaining the corresponding thermal-displacement estimated values of the spindle at the different time points and the changes of the thermal displacement values at the individual time points includes:
inputting the temperature change values to the thermal compensation model to obtain the thermal-displacement estimated values of the tip point of the spindle at the different time points; and
calculating the changes of the thermal displacement values at the individual time points.

2. The warm-up method of machine tool of claim 1, wherein the step of establishing the thermal compensation model includes a step of: training the input values and the output values via a machine learning method so as to obtain the thermal compensation model.

3. The warm-up method of machine tool of claim 1, wherein the step of establishing the thermal compensation model includes a step of: applying a multiple regression analysis to calculate the input values and the output values to obtain the thermal compensation model.

4. The warm-up method of machine tool of claim 1, wherein the step of defining the temperature change values of the at least one component of the machine tool collected at the different time points to be the input values includes the steps of:
mounting a plurality of temperature sensors to the at least one component of the machine tool to measure the temperature values of the at least one component of the machine tool;

defining a first measurement of the temperature values of the at least one component to be an initial temperature value; and obtaining the temperature change values of the at least one component by subtracting the initial temperature value from the corresponding temperature values of the at least one component measured at the different time points.

5. The warm-up method of machine tool of claim 1, wherein the step of deriving each corresponding warm-up completion degree includes the steps of:

defining a ratio of the change of the thermal displacement value at one of the individual time points other than a first time point to the change of the thermal displacement value at the first time point as a corresponding calculation basis;

defining an absolute value of the calculation basis to be a deduction; and obtaining the corresponding warm-up completion degree by subtracting the deduction from 1 to obtain a value and further multiplying the value by 100.

6. The warm-up method of machine tool of claim 5, wherein the step of defining the ratio includes the steps of:

setting a threshold value; and a 100% warm-up completion degree being achieved if the change of the thermal displacement values at one of the individual time points reaches the 5 threshold value.

\* \* \* \* \*